United States Patent [19]

Wood

[11] Patent Number: 5,494,118
[45] Date of Patent: Feb. 27, 1996

[54] PLACEMENT OF PIPES IN THE GROUND

[75] Inventor: Eric Wood, deceased, late of Castletown, Isle of Man, by Miranda J. Bull, Legal Representative

[73] Assignee: Insituform (Netherlands) B.V., Netherlands

[21] Appl. No.: 204,165

[22] PCT Filed: Oct. 14, 1992

[86] PCT No.: PCT/GB92/01878

§ 371 Date: Jun. 30, 1994

§ 102(e) Date: Jun. 30, 1994

[87] PCT Pub. No.: WO93/08367

PCT Pub. Date: Apr. 29, 1993

[30] Foreign Application Priority Data

Oct. 14, 1991 [GB] United Kingdom .............. 9121786

[51] Int. Cl.⁶ .................................................. E21B 7/00
[52] U.S. Cl. ................................................... 175/22
[58] Field of Search .................... 175/22, 23, 61, 175/62, 73–75

[56] References Cited

U.S. PATENT DOCUMENTS 4,507,019 3/1985 Thompson .................... 175/22 X

FOREIGN PATENT DOCUMENTS

| 0044706 | 1/1982 | European Pat. Off. . |
| 2654487 | 5/1991 | France . |
| 197802 | 2/1978 | Switzerland ................ 175/22 |
| WOA9010173 | 9/1990 | WIPO . |

Primary Examiner—Michael Powell Buiz
Attorney, Agent, or Firm—Cowan, Liebowitz & Latman

[57] ABSTRACT

The invention provides that an underground through borehole (28) is formed with a reaming tool (24). It is filled with a viscous fluid and as soon as possible after being so filled, a flexible lining tube (32) is inserted into the borehole (28) to keep the surface from collapsing until a rigid service pipe (12) has been pulled or pushed into the borehole.

6 Claims, 1 Drawing Sheet

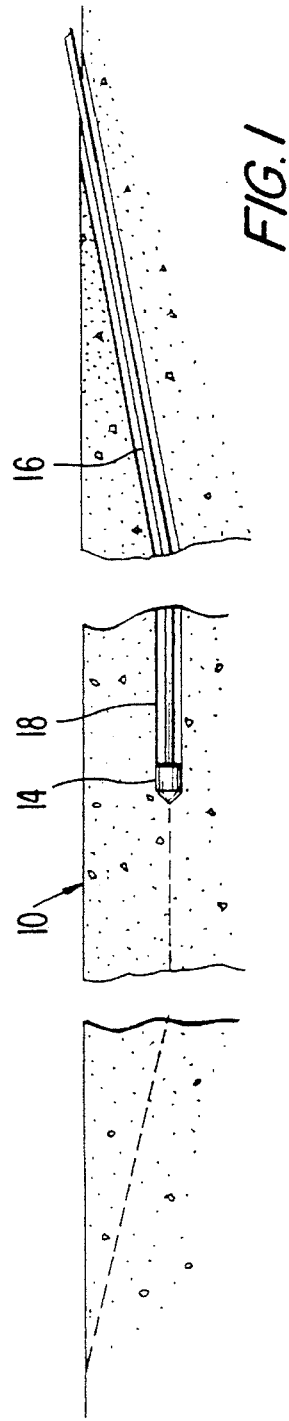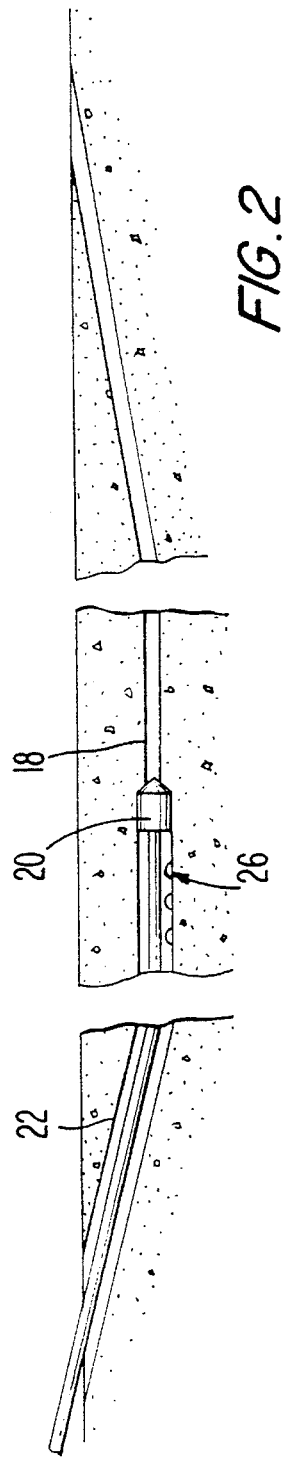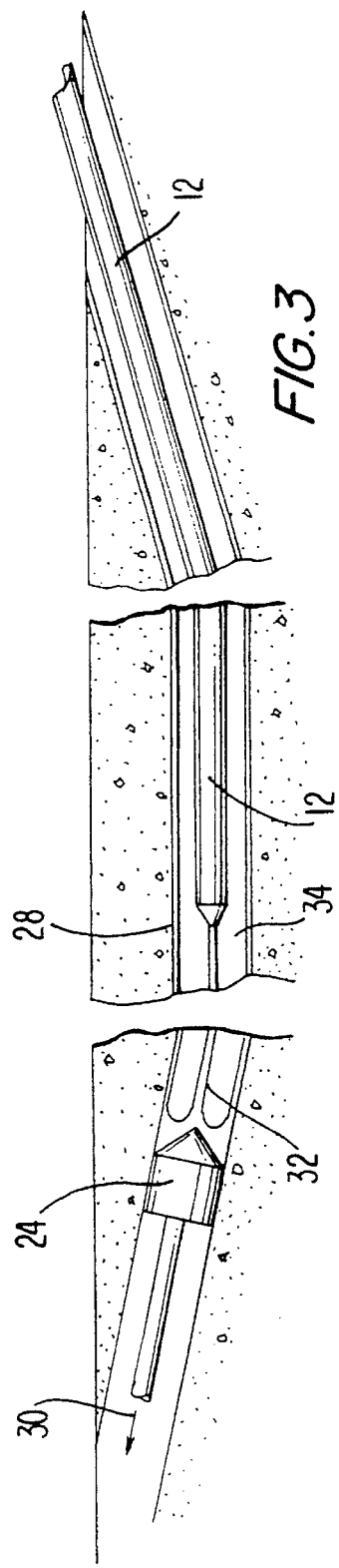

PLACEMENT OF PIPES IN THE GROUND

This invention relates to the placement of pipes in the ground.

The said pipes are rigid in nature so as to be capable of supporting the loading applied thereto by the surrounding ground and water table. Typically the pipes will be of steel or other rigid metal.

When it is required to place such pipes in the ground, obviously there needs to be excavation or boring in order to provide a cavity to receive the pipe. The most usual method of placing such a pipe is to use a boring or drilling rig which comprises a reaming head or more usually a plurality of reaming heads and a drill string. The reaming head is directed by remote control along a particular drilling path under the ground. It enters the ground at a shallow angle and then travels along the path in which the pipe is to be laid, and it eventually emerges from the ground at a desired remote location. A plurality of reaming heads of increasing size are used, and the heads are passed sequentially through the bore hole. The reaming heads as appropriate may be pulled rearwards through the previously formed borehole, but in any event the hole is continually increased in size until it is of the required diameter to receive the pipe which is simply pulled into position. During the reaming operation, a relatively viscous liquid known as Bentonite is flooded into the borehole being created which serves to some extent to maintain the shape of the hole and to stop debris and chippings from collecting to too great an extent in the base of the hole, and also to assist in the cutting operation, but as can be expected rock chippings and stones become suspended in the Bentonite, and some do collect at the base of the borehole. The result of this is that when the rigid pipe is eventually pulled into position it can be obstructed by these loose materials and if it is obstructed to too great an extent, then it is extremely difficult to pull the pipe into the desired position due to the friction forces created by these materials. Indeed, in practice it is the case that the length of pipe which can be pulled into a borehole is limited by these friction forces.

The rigid pipe may typically be a pipe for carrying fluid, or it may be a pipe for carrying other pipes some of which may be fluid pipes and others of which may be service pipes carrying electrical cables or telephone cables. Indeed the pipe can itself carry electrical cables.

The present invention seeks to enhance the laying operation to enable the pipe to be inserted more easily and to enable longer lengths of the pipe to be installed without difficulty.

In accordance with the present invention, in a boring operation wherein a rigid pipe is placed in the borehole, wherein a support lining tube of a flexible nature is used to support the surface of the borehole by the use of fluid pressure which urges the lining tube against said surface, and the rigid pipe is inserted into the flexible lining tube, and wherein the flexible lining tube is everted into and along the borehole immediately behind the last reaming head used for boring the borehole and wherein the rigid pipe is connected to the trailing end of the flexible lining tube so as to be pulled into the borehole thereby.

In accordance with a further embodiment of the present invention, in a boring operation wherein a rigid pipe is placed in the borehole, wherein a support lining tube of a flexible nature is used to support the surface of the borehole by the use of fluid pressure which urges the lining tube against the surface, and the rigid pipe is inserted into the flexible lining tube, and wherein the flexible lining tube is everted into and along the borehole immediately behind a reaming head used for boring the borehole and wherein a pull rope is attached to the trailing end of the lining tube so as to be pulled thereby into the borehole, and subsequently, the rope is used for pulling the rigid pipe into the borehole.

Preferably, water is used for the urging of the lining tube onto the borehole surface so that the rigid pipe is pulled into the inflating water.

By the use of a lining tube, which is pressurized, the chippings and cuttings formed by the reaming operation are kept urged on the borehole surface, especially if the eversion takes place immediately behind the reaming head.

The everting face of the lining tube will also divert any Bentonite remaining in the borehole.

The lining tube may comprise a tube formed from a laminate made of a fibrous felt material such as a needle polyester felt one side of which is coated with an impermeable membrane, the laminate being formed into tubular configuration with the butting edges secured and sealed together, or it may comprise a fabric which is coated with a synthetic plastic resin so that it is strong enough to withstand the everting pressure. It is possible to apply the lining tube after the last reaming head is removed from the borehole, but this would mean that there will be a significant time period during which the borehole is full of the Bentonite and chippings, which would have to be displaced by the insertion of the lining tube which may cause problems.

The lining tube may be made up of inner and outer sections, and the outer section may be pulled into the borehole behind the reaming head, and the inner section may be everted into the outer section after it is placed in position.

An embodiment of the invention will now be described, by way of example, with reference to the accompanying diagrammatic drawings, wherein: FIG. 1 shows how a borehole is formed in the ground, such borehole being for receipt of a rigid pipe; FIG. 2 shows a later stage of the boring process; and FIG. 3 shows how the lining tube and the rigid pipe are placed in the borehole in accordance with the preferred method of the invention.

Referring to the drawing, reference (10) indicates the ground level, and under the portion of ground shown there is provided an underground borehole in which is to be inserted a steel or other rigid pipe (12) (FIG. 3) which may be a fluid carrying pipe such as a water or gas pipe, or may be for carrying service pipes and cables.

In the figures, different sections of the ground (10) are shown because one must remember that this borehole to be provided in the ground will be of substantial length. The borehole is inclined at the respective ends thereof to a level at which the pipe will be installed.

In the formation of these boreholes, typically a drilling string is used comprising a reaming head (14) which is propelled by a rod or drill string (16) so that an initial borehole (18) is formed.

Progressively, larger reaming heads (20) are passed through the previously formed borehole (18) to form larger bores (22).

The process is repeated as many times as necessary, and the reamer may be entered from either end of the bore hole and it may be pushed through forwardly or pulled through in reverse.

In the normal method, after the largest reamer (24) (FIG. 3) has passed through the borehole creating the final size, the pipe (12) is pushed into the formed borehole to take its final position.

During the reaming operation, there issues from the drill string, typically the reaming head, a flow of a liquid support material which is a highly viscous liquid known by the name Bentonite. The Bentonite tends to maintain the integrity of the formed borehole, and also keeps particles and chippings from falling into the formed borehole. The Bentonite is effective only to a limited extent however, and particles do become suspended in the Bentonite or fall to the base of the borehole as shown at (26) in FIG. 2.

The result of this is that when the pipe (12) is finally pushed into the bore behind the largest reamer (24), the pipe does tend to catch on the chippings and debris in the bore and this makes forcing of the pipe through the bore difficult. Indeed this has a limiting effect on the length of pipe which can be inserted into the bore and therefore has a limiting effect on the length of bore which can be provided.

Obviously, it is desirable to be able to make the borehole as long as possible so that a maximum length of pipe can be inserted, and this invention is concerned with a method whereby the insertion of extended lengths of pipe can be performed without difficulty.

In accordance with the invention a flexible lining tube (32) is applied to the borehole (28) when it is at its final size prior to the insertion of the tube (12).

As shown in FIG. 3, the borehole (28) behind the final reaming head (24) which is being removed as indicated by arrow (30), is lined by everting a flexible lining tube (32) into the borehole (28), eversion being performed typically by means of water filling the tube in the region (34) and performing the eversion.

To the end of the lining tube (34) the pipe (12) may be attached so that it is pulled into the borehole by the everting lining tube.

The lining tube (32) keeps the loose chippings and debris from the wall of the borehole in position at the borehole surface, so the resulting surface through which the pipe (12) can pass is much more smooth and is more regular.

The lining tube (32) may be constructed of any suitable material. For example it may be a tube of fibrous felt material having on its inner surface a coating of impermeable material. By everting such a lining into the borehole (28) the felt will eventually lie to the inside, and the film will lie to the outside of the borehole.

In another arrangement, the tube in flattened form may be pulled into the borehole (28) behind the reaming head (24), and the lining tube may be inflated by another tube which is everted into the first mentioned tube.

Eversion of felt tubes with coatings is known in lining processes wherein the felt material is soaked with curable synthetic resin. Such tubes may be used in this method, but of course it is not necessary and indeed it is undesirable that curable synthetic resin should be provided. The felt tube will in fact be dry.

The lining tube (32) performs only a temporary holding function, because after the rigid pipe (12) has been inserted, the function of the tube (32) is to a large extent terminated. If the ground subsequently subsides therefore around the pipe (12), this will be of no significance because the rigidity of the pipe is inherent in the material used for same which typically will be steel or other metal, although other materials can be used.

The invention provides an extremely effective means of ensuring that long lines of rigid pipe can be inserted in underground bores.

In a modified form of the invention, instead of the pipe (12) being pulled into the borehole (28) by means of the everting tube (32) a strong rope, e.g. nylon, may be pulled through the borehole (28) by the lining tube or other means, and the rope then is used to pull the pipe (12) into position in the borehole (28). This modification is of particular use when the material of the lining tube (32) may not be of sufficient tensile strength to pull the pipe (12) into position.

I claim:

1. A method of placing a substantially rigid pipe (12) in a borehole, in the ground, comprising:

boring a longitudinal borehole in the ground with a boring member including a reaming head (24);

everting a flexible lining tube (32) into and along the borehole (28) immediately behind the advancing boring member; and supporting the lining tube 32 against the surface of the borehole (28) by fluid pressure;

connecting a substantially rigid replacement pipe (12) to the trailing end of a flexible lining tube (32), the rigid pipe (12) is pulled into the borehole (28) as the flexible lining tube (32) everted by fluid pressure.

2. The method of lining a borehole of claim 1, including the step of attaching a pull rope to the trailing end of the lining tube (32) and attaching the opposite end of the rope to the leading end of the substantially rigid pipe (12) so that the pipe is pulled into the borehole (28) as the flexible lining tube (32) is everted.

3. The method of claim 1, including the step of filling the borehole (28) with a viscous fluid before everting the lining tube (32) into the borehole (28).

4. The method of claim 1, including selecting a lining tube (32) which is a laminate of a layer of fibrous material and a plastic material film or a coating on at least one surface of the felt, arranged so that after eversion the the film or coating is disposed on the inside of the tube (32).

5. The method of claim 1, including the step of selecting a lining tube (32) of a first section and a second section attached to the first section;

pulling the first section into the borehole (28) and the second section is everted into the outer section, the substantially rigid pipe attached to the trailing end of the everting second section to pull the rigid pipe (12) into the borehole (28).

6. A method of placing a substantially rigid pipe (12) in a borehole (28); comprising:

boring a longitudinal borehole in the ground with a boring member including a reaming head (24);

everting the flexible lining tube (32) with a fluid immediately behind the advancing boring member (24);

supporting the flexible lining tube (32) against the surface of the borehole (28) by fluid pressure;

attaching a pull rope to the trailing end of the everting lining tube so as to be pulled into the borehole (28); and attaching the trailing end of the rope to the substantially rigid pipe (12) for pulling the pipe (12) into the borehole (28).

* * * * *